United States Patent [19]

Cagliostro et al.

[11] Patent Number: 5,814,397
[45] Date of Patent: Sep. 29, 1998

[54] METHOD FOR WATERPROOFING CERAMIC MATERIALS

[75] Inventors: Domenick E. Cagliostro, Berkeley; Ming-Ta S. Hsu, San Jose, both of Calif.

[73] Assignee: The United States of America as represented by the Administrator of the National Aeronautics and Space Administration, Washington, D.C.

[21] Appl. No.: 537,585

[22] Filed: Sep. 13, 1995

[51] Int. Cl.6 ................ B64C 1/40; B32B 5/18; B32B 18/00
[52] U.S. Cl. .............. 428/216; 428/307.3; 428/307.7; 428/312.6; 428/336; 428/447; 428/698; 428/704; 428/920; 244/133; 427/226; 427/255.3; 427/244; 427/245; 442/79; 442/81; 442/86; 442/87
[58] Field of Search ................ 428/446, 447, 428/704, 698, 216, 336, 307.3, 307.7, 312.6, 920; 427/412, 407.1, 344, 515, 244, 245, 255.3, 226; 244/158 A, 163, 121, 133; 442/79, 81, 86, 87

[56] References Cited

U.S. PATENT DOCUMENTS

| | | | |
|---|---|---|---|
| 2,774,690 | 12/1956 | Cockett et al. | 117/135.5 |
| 4,093,771 | 6/1978 | Goldstein et al. | 428/312 |
| 4,259,409 | 3/1981 | Arnold | 428/428 |
| 4,338,368 | 7/1982 | Dotts et al. | 428/212 |
| 4,358,480 | 11/1982 | Ecord et al. | 427/140 |
| 4,387,195 | 6/1983 | Tully et al. | 525/475 |
| 4,597,985 | 7/1986 | Chandros et al. | 427/39 |
| 4,649,063 | 3/1987 | Canova et al. | 427/230 |
| 4,746,480 | 5/1988 | Clark | 264/62 |
| 4,756,977 | 7/1988 | Haluska et al. | 428/704 |
| 4,814,407 | 3/1989 | Canova et al. | 528/21 |
| 5,038,693 | 8/1991 | Kourtides et al. | 112/440 |
| 5,145,723 | 9/1992 | Ballance et al. | 427/397.7 |
| 5,277,959 | 1/1994 | Kourtides et al. | 428/116 |
| 5,296,288 | 3/1994 | Kourtides et al. | 428/262 |
| 5,516,596 | 5/1996 | Camilletti et al. | 428/698 |

OTHER PUBLICATIONS

Dotts et al "The Toughest Job Ever". pp. 616–626, Chemtech, Oct. 1983.
Schomberg et al., SAE Technical Paper Series No. 831117 "Moisture Absorption Characteristics of the Orbiter Thermal Protection System and Methods Used to Prevent Water Ingestion", Thirteenth Intersociety Conference on Environmental Systems, San Francisco, CA, Jul. 11–15, 1983.

*Primary Examiner*—Leszek Kiliman
*Assistant Examiner*—D. Lawrence Tarazano
*Attorney, Agent, or Firm*—Kathleen Dal Bon; Harry Lupuloff; John G. Mannix

[57] ABSTRACT

Hygroscopic ceramic materials which are difficult to waterproof with a silane, substituted silane or silazane waterproofing agent, such as an alumina containing, fibrous, flexible and porous, fibrous ceramic insulation used on a reentry space vehicle, are rendered easy to waterproof if the interior, porous surface of the ceramic is first coated with a thin coating of silica. The silica coating is achieved by coating the interior surface of the ceramic with a silica precursor, converting the precursor to silica either in-situ or by oxidative pyrolysis and then applying the waterproofing agent to the silica coated ceramic. The silica precursor comprises almost any suitable silicon containing material such as a silane, silicone, siloxane, silazane and the like applied by solution, vapor deposition and the like. If the waterproofing is removed by, e.g., burning, the silica remains and the ceramic is easily rewaterproofed. An alumina containing TABI insulation which absorbs more that five timed its weight of water, absorbs less than 10 wt. % water after being waterproofed according to the method of the invention.

33 Claims, No Drawings

METHOD FOR WATERPROOFING CERAMIC MATERIALS

ORIGIN OF THE INVENTION

The invention described herein was made in the performance of work under a NASA contract and is subject to Public Law 95-517 (35 U.S.C. 200 et seq.). The contractor has waived all rights in and to the invention. The contractor has not elected to retain title in the invention.

BACKGROUND OF THE INVENTION

1. Field of the Invention

The invention relates to waterproofing ceramic materials. More particularly, the invention relates to waterproofing ceramic materials, including rigid and flexible ceramic thermal insulation materials of a type used on space vehicles, by providing a silica coating on the ceramic, followed by coating the so-formed silica coated ceramic with a silicon containing waterproofing material, such as a silane.

2. Background of the Disclosure

Reusable space vehicles, such as the space shuttle which must leave and reenter the earth's atmosphere, require exterior thermal insulation. The successful operation of the space shuttle required the development of light weight and very thermally efficient exterior insulation which had to withstand a wide variety of environments. During reentry back into earth's atmosphere, the insulation must maintain the vehicle's exterior structure below 175° C. while experiencing substantial aeroconvective thermal environments which can heat the surface of the insulation to temperatures in excess of 1,000° C. In space the thermal protection must insulate the vehicle from the deep and constant cold (e.g., −70° C.) experienced while in orbit. In addition to thermal and aeroconvective environments, the insulation must also be able to withstand the mechanical stress associated with launch vibrations, acoustics, structural movement of the surface of the vehicle and of the ceramic insulation, and the landing impact. The ceramic insulation must be unaffected by contact with salt water and spray, and must also be waterproof. Thermal insulation for protecting space vehicles has included both rigid and flexible silica ceramics and, more recently, both rigid and flexible composites of a plurality of ceramic layers both with and without intervening layers of metal. The flexible ceramics are woven and felted from ceramic thread and fibers into cloth and batting, sewn together with ceramic thread.

These ceramic composites are very porous, having a void volume of over 90%. They are also hygroscopic, being able to absorb more than three to five times their own weight of water. Besides adding to the weight of the insulation, the presence of water in the ceramic insulation can create other, more serious problems. If the insulation is rigid and contains significant amounts of moisture when entering space, the moisture freezes in the sub-zero space environment. Initially the water expands as it freezes and then contracts as it rapidly cools down. This cracks the ceramic insulation. On reentry into earth's atmosphere, the frozen moisture present in the insulation will explosively vaporize, thereby destroying the integrity of the insulation and even blasting some of it off the surface of the vehicle. This requires repair and replacement of the affected insulation and can also expose the outer metal skin of the vehicle to temperatures well in excess of 175° C. On one occasion as a result of a hail storm at the JFK Space Center, so many tiles on the Space Shuttle lost their waterproofing and picked up moisture, that the orbital time line of the vehicle had to be changed to provide a favorable Sun attitude to drive the water out of the tiles before ice damage could occur. Flexible ceramic insulation is more forgiving with respect to freeze/thaw damage, but the excess weight of absorbed water is still a significant problem. Therefore, it is imperative to the successful operation of reentry space vehicles such as the space shuttle, that the insulation be waterproof and not absorb moisture.

More advanced ceramic insulation has been and continues to be developed for space shuttles and other reentry space vehicles in which either all or a substantial portion of the insulation comprises one or more refractory metal oxides, carbides, borides, silicides, borosilicates and nitrides as set forth above and disclosed, for example, in U.S. Pat. Nos. 5,038,693, 5,277,959 and 5,296,288, the disclosures of which are incorporated herein by reference. Ceramic materials currently in use or in development include high purity silicon dioxide, aluminum oxide, silicon carbide, aluminosilicate, aluminoborosilicate and zirconium diboride as illustrative, but nonlimiting examples. The insulation is reusable, can be flexible, and as mentioned above comprises composites of a plurality of layers of different materials, sane of which include metals. As with insulation comprising primarily silica, these new types of advanced insulation are also hygroscopic. Unlike silica which is easily waterproofed with a silane waterproofing agent, other materials such as alumina are difficult to waterproof and require multiple treatments of large amounts of toxic and expensive waterproofing agents. Therefore, reducing the amount and number of treatments required to waterproof such insulation material with a silane waterproofing agent would represent a significant improvement to the art. Further, since the waterproofing is burned off during reentry into the atmosphere, the insulation must be able to be rewaterproofed on the vehicle and preferably at ambient conditions.

SUMMARY OF THE INVENTION

The present invention relates to the discovery that hygroscopic ceramic materials which are difficult to waterproof (such as alumina) with a silicon containing waterproofing agent are easily waterproofed if the ceramic material is first coated with silica. Thus, the invention relates to a method for waterproofing a ceramic which comprises providing a silica coating on the ceramic and then coating the silica coated ceramic with a silicon containing waterproofing agent. The invention also relates to a waterproof ceramic or ceramic composite comprising a ceramic substrate coated with silica and having a coating of a silicon containing waterproofing agent disposed over the silica coating, wherein at least a portion of the ceramic composite comprises a ceramic material such as alumina which is difficult to waterproof with a silicon containing waterproofing agent. In another embodiment the invention relates to a method for waterproofing a ceramic which method comprises coating the surface of the ceramic with a coating of a silica precursor, converting the silica precursor to silica and then coating the silica coated ceramic with a silicon containing waterproofing agent, such as a silane. This invention is useful for waterproofing both dense and porous ceramics. By waterproofing is meant that a ceramic waterproofed according to the practice of the invention picks up less than 25 wt. %, preferably less than 15 wt. %, more preferably less than 10 wt. % and still more preferably less than 5 wt. % water after being in contact with water for a period of at least ten minutes. Also, by waterproofed or waterproofing is meant that the ceramic is rendered water repellant and not water impervious.

The invention is useful for waterproofing rigid and flexible ceramic insulation used on space vehicles, such as the space shuttle, which is difficult and expensive to waterproof if the process of the invention is not used, because the insulation contains a difficult to waterproof material, such as alumina. Thus, hygroscopic ceramic materials which are difficult to waterproof with a silane, siloxane or silazane waterproofing agent, such as an alumina containing, porous, flexible or rigid ceramic insulation used on a reentry space vehicle, are rendered easy to waterproof if the surface of the ceramic is first coated with a coating of silica. The silica coating is achieved by coating the surface of the ceramic with a silica precursor, converting the precursor to silica, and then applying the waterproofing agent to the silica coated ceramic. The silica precursor comprises almost any suitable silicon containing material such as a silane, silicone, siloxane, silazane and the like applied by solution, vapor deposition and the like. If the waterproofing is removed, the silica coating remains and the ceramic is easily rewaterproofed. As an illustrative, but nonlimiting example, a flexible insulation fabricated from ceramic fibers and containing alumina batting which absorbs more than five times its weight of water, absorbs less than 10 wt. % water after being waterproofed according to the method of the invention.

A ceramic article waterproofed according to the method of the invention from which the silicon containing waterproofing agent has been removed (e.g., by pyrolysis) is readily rewaterproofed by reapplying the waterproofing agent to the ceramic. It has further been found that the silica coating provided on the ceramic according to the practice of the invention is reusable in that it survives the conditions of heat and oxidation similar to that experienced by the surface of a space vehicle on reentry into the earth's atmosphere over many cycles and therefore is reusable. Thus, the ceramic insulation on a space vehicle waterproofed according to the process of the invention is easily rewaterproofed in-situ on the vehicle after reentry and docking.

DETAILED DESCRIPTION

As set forth above, although by no means limited to this embodiment, the practice of the invention has been found useful in waterproofing rigid and flexible ceramic insulation used on reentry space vehicles in which the insulation contains one or more materials which are otherwise difficult and expensive to waterproof, such as alumina. Those skilled in the art know that many ceramic materials, and particularly metal oxide ceramic materials are hygroscopic and absorb water if not waterproofed. This phenomenon of hygroscopicity has been known for a long time and silicon containing materials have been and still are used to waterproof ceramic articles. However, the invention does not reside in either using silicon containing materials to waterproof hygroscopic ceramics or in applying a silica coating to the ceramic surface, but in the combination of first providing a silica coating on the surface of a ceramic which is difficult to waterproof and then applying a coating of a silicon containing waterproofing over the silica coated ceramic surface. By ceramic surface is meant to include the interior surface of a porous ceramic article such as rigid and flexible ceramic insulation and particularly ceramic insulation fabricated from ceramic fibers, such as insulation used and prepared for use by reentry space vehicles. This includes ceramic insulation which is a composite of many layers of materials, some of which may be metal and plastic and which are also used as thermal control means, illustrative, but nonlimiting examples of which are disclosed in the '693, '959 and '288 patents referred to above as well as in articles by Dotts et. al. and by Schomberg, et. al. referred to in more detail below.

Many of these ceramics are so porous that they have interior void volumes of more than 90%. It is this interior surface structure which must be waterproofed as well as the external surface of the ceramic. Thus, the practice of the invention provides a waterproof coating to the entire surface of the ceramic in such applications, both interior and exterior as will be further explained below. Further, both the silica coating and the coating of waterproofing agent are very thin, being on the order of less than one micron, which renders the silica coating applied by the process of the invention flexible in contrast to the rigid and concomitantly brittle siliceous coatings of the prior art.

There are a variety of silicon containing waterproofing agents which are known in the art and which are useful in imparting hydrophobicity or waterproof properties to ceramics in the practice of the invention. For, example, U.S. Pat. No. 2,774,690 discloses the deposition of siliconaceous substances on the surface of materials, including ceramics, normally non-water repellent for making them water repellent. Silicon containing compounds disclosed as useful include substituted silanes such as alkyl-, aralkyl-, alkyloxy-, aralkyloxy-silanes, or halogeno-silanes, amino silanes (silylamines), silazanes, silanols, siloxanes, polysiloxanes or silicones, and silicon esters. This patent claims a mixture of a methylpolysiloxane with a methylhydrogenpolysiloxane and a titanium compound for waterproofing ceramics and fabrics. U.S. Pat. No. 4,387,195 discloses reactive polydiorganosiloxane liquid and a disilazane, while U.S. Pat. Nos. 4,649,063 and 4,814,407 disclose silanes for waterproofing porous rigid, sintered and pressed bodies of short staple amorphous silica fiber (such as tiles for a space vehicle) by coating the bodies internally throughout the pore structure, with a halide-free alkylalkoxysilane having the general formula $(RO)_{4-n}$—Si-$[(R')-(QR')_y]_n$, wherein R is an alkyl group or fluorine substituted alkyl group containing from 1 to 3 carbon atoms, R' is hydrogen or aryl, or alkyl, or alkene group containing from 2 to 10 carbon atoms, R" is an alkyl group or fluorine substituted alkene containing from 2 to 10 carbon atoms, n is 1 to 3, y is 0 or 1, and when y is 1, R' is alkene or substituted alkene containing from 2 to 10 carbon atoms. A heteroatom, $\Omega$, may be present in the alkyl substituent attached to silicon such as O, N, or S. The disclosures of these patents are incorporated herein by reference. Suitable polysiloxanes or silicones may also be used as waterproofing agents in the practice of the invention. The silicon containing waterproofing agent is applied by any suitable means. However, it has been found convenient to provide a waterproof coating to a silica coated ceramic in the practice of the invention by using one or more silanes such as dimethylethoxysilane and hexamethyldisilazane both of which as a vapor easily applied as liquid, and also methyltrimethoxysilane which are deposited on the silica coated insulation and converted to a siloxane by contact with acetic acid and water vapors. A coating of a silicon containing waterproofing agent according to the practice of the invention excludes a thick coating of silicone applied to the outer, exterior surface of the ceramic such as the cast silicone (Dow Corning DC 92-007) coating disclosed in the Dotts, et. al, article below. Preferred waterproofing agents include those selected from the group consisting essentially of silanes, substituted silanes and silazanes (including disilazanes) and mixture thereof.

Without wishing to be held to any particular theory, it is believed that chemical reactions occur between the waterproofing agent and the ceramic substrate as illustrated below for methyltrimethoxysilane which is applied by vapor deposition and catalyzed with acetic acid and water vapor (not shown):

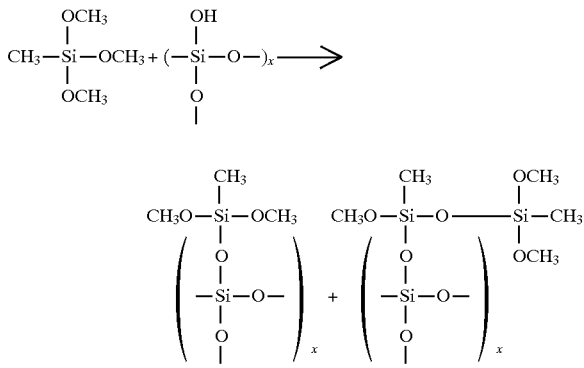

and for hexamethyldisilazane:

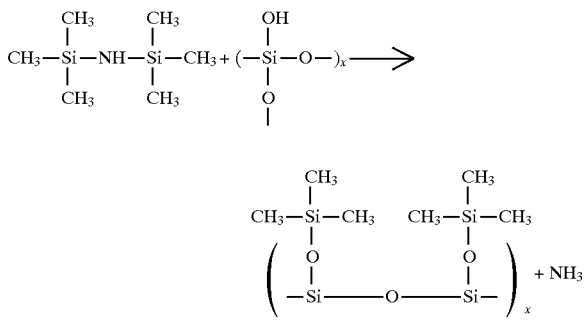

In the above equations the —[HOSi(O)$_2$]— represents a silica substrate. It is believed that the waterproofing material reacts with the silica to form a hydrophobic water repellant siloxane (in some cases a polysiloxane if cross linking occurs) coating on the surface of the silica. In the context of the invention therefore, by waterproofed or waterproofing is meant that the waterproofed ceramic is water repellant, as opposed to being impervious to water.

Unlike the relatively thick, rigid and brittle glass coatings of the prior art, the silica coating applied according to the practice of the invention is typically thin enough to be flexible, so that it can be used on both rigid and flexible porous ceramic insulation without cracking and exposing the hygroscopic insulation under the coating to moisture. As shown in the Examples below, a typical silica coating according to the invention to alumina fiber batting in which the fibers have a mean diameter of 3 microns experiences weight increase of less than 5 wt. % when provided with a silica coating according to the practice of the invention. If the silica coating was as little as one micron thick, the batting would have experienced a weight increase of about 50 Wt. %. This thus gives an idea of the thinness of the silica coating according to the practice of the invention. Further, and at least as important, as set forth above the silica coating applied in accordance with the process of the invention penetrates the interior void volume of a porous ceramic and coats the interior surface as well as the exterior or outer surface with a thin coating of silica. In the case of ceramic insulation fabricated at least in part of ceramic thread, filaments and fibers which results or a woven, felted or matted ceramic having a void volume typically at least about 90%, the silica coating and the silane coating applied to the ceramic in the practice of the invention coats both the exterior surface and also penetrates into the interior void of the ceramic, thereby coating the interior surface as well. The interior surface of such ceramic comprises fibers, threads and filaments. Thick, brittle glass coatings, have been used, in part, to impart moisture resistance to rigid and flexible porous ceramic insulation having a void volume of greater than 90%, by coating the exterior outer surface of the ceramic insulation as disclosed in U.S. Pat. Nos. 4,093,771; 4,358,480; 4,746,480, and 5,296,288 and also in an article by Dotts, et. al. "The Toughest Job Ever", p.616–626 in Chemtech, October, 1984 and an article by Schomberg, et. al., SAE Technical Paper Series No. 831117 "Moisture Absorption Characteristics of the Orbiter Thermal Protection System and Methods Used to Prevent Water Ingestion", Thirteenth Intersociety Conference on Environmental Systems, San Francisco, Calif., Jul. 11–15, 1983. The glass coatings are typically borosilicate or aliminoborosilicate surface coatings, optionally containing particulate (silicon tetraboride (black) as an emittance agent to increase the emissivity of the coating. However, the glass is an exterior surface coating and doesn't coat the fibers of the porous interior of the insulation (if it did the insulation would weigh too much). The glass coated insulation is further treated with a silane waterproofing agent such as vapor deposition of methyltrimethoxysilane or deposition of hexamethyldisilazane, both of which have been stated as useful in the practice of the invention, to provide a hydrophobic surface and thereby increase the moisture resistance. However, the rigid silica insulation is so brittle and the glass so brittle, that it easily cracks. Cracks in the glass coating result in the hygroscopic silica insulation under the crack picking up moisture like a wick. Thus, the glass coated rigid ceramic on the shuttle Columbia was damaged by the hail storm so much that the integrity of the brittle coating was impaired and the insulation absorbed too much water. Thus, the silica coating applied according to the invention represents an improvement over the thick, brittle, rigid glass coatings of the prior art.

The silica coating is applied to the surface of the ceramic insulation by any suitable method such as chemical vapor deposition (CVD), low pressure chemical deposition (LPCVD), immersion or injection, etc. at the discretion of the practitioner. While it may be possible to coat the interior and exterior surface of a porous ceramic made from fibers with a sol-gel method of which there are many pathways known to those skilled in the art, vapor and liquid applications are preferred for convenience. As with the waterproofing agents, there are many silicon containing compounds which are useful in coating the ceramic with a silica precursor which is then converted to a thin silica coating in the practice of the invention. These include polysiloxanes or silicone oils, resins, and rubbers or elastomers, as well as silanes, substituted silanes, siloxanes, silazanes and other silica precursors as will be appreciated by those skilled in the art. For example, the silica coating can be applied to the interior and exterior surface of the ceramic fibers of rigid and flexible insulation by a CVD or LPCVD process in which the silica precursor is one or more of tetraethoxysilane, a diacetoxysilane compound represented by the formula (RO)$_2$Si (OAc)$_2$ where R is a tertiarybutyl (DABS) or isopropyl (DADIS) moiety or tritertiarybutoxyethoxysilane, diacetoxydibutoxysilane, and silicon tetrakisdiethyloxyamine as are known to those skilled in the art and some of which are disclosed, for example, in U.S. Pat. No. 4,597,985. These presursors form a silica coating in-situ on the surface of the ceramic in the deposition chamber by decomposition of the precursor and therefore do not need to be decomposed as a separate step. In the context of the practice of the invention such processes in which the silica precursor decomposes in-situ to form silica is meant to be included in describing the process of the invention as including depositing a silica precursor on the surface of the ceramic and then converting the precursor to silica. In yet another embodiment of the practice of the invention, the silica coating on the surface of the ceramic is formed in-situ on the ceramic as shown in greater detail in Example 8 below. In this example a ceramic insulation containing alumina batting was coated by contacting the porous ceramic with methyltrimethoxysilane vapor as a silica presursor, over which a coating of dimethylethoxysilane waterproofing agent was applied, thus rendering the so-coated ceramic waterproof. This was then heated in air at 1,000° C. for two hours which destroyed the waterproofing and pyrolyzed the silica precursor to silica. Reapplying the waterproofing agent again rendered the ceramic waterproof. Another method and material for forming a thin silica coating on a ceramic surface is disclosed, for example, in U.S. Pat. No. 5,145,723.

The invention will be further understood with reference to the examples below.

EXAMPLES

In all of the examples below, the ceramic insulation is a flexible, blanket type thermal insulation comprising a central layer of alumina fiber batting covered at the top and the bottom by a thinner layer of a silicon carbide woven fabric. The silicon carbide fabric is sewn onto the alumina batting with ceramic thread. The insulation is about one inch thick, with the top and bottom silicon carbide layers being about one eighth of an inch thick. This insulation is a species of insulation generically known as TABI (Tailorable Advanced Blanket Insulation). The alumina batting is commercially available from ICI Americas Inc. in Wilmington, Del. as SAFFIL$^R$ and is made from a low alpha grade of alumina fiber having a mean diameter of 3 microns. The bulk density of the batting is about 6 lb/ft$^3$ and has a void volume greater than 90%.

Example 1

In this example a solution of RTV655 is prepared and applied to the TABI insulation described above which comprises alumina fiber batting sandwiched between two thinner layers of silicon carbide fabric. The RTV655 is used as a silica precursor and comprises a silicone rubber mixture manufactured and supplied by GE Silicones in Waterford, N.Y. The RTV655 is described as containing a vinylstopped phenylmethyl polymer, a vinyl resin and methylpolysiloxanes. The RTV655 canes in two parts, part A and part B, which are combined in a ratio of 10 parts of A to 1 part of B. Part A contains the reactive mixture and part B contains a catalyst for curing or crosslinking the material to form a silicone rubber. The designation RTV means that it is room temperature vulcanizable. The RTV655 is dissolved in toluene to make up a 1 wt. % solution. This amount of dilution is done to greatly reduce the viscosity of the RTV655, thereby permitting it to penetrate into the pores of the insulation and coat the fibers. This insures that the silicone coats the fibers of the batting and the two outer layers, and does not form an outer surface coating. A sample of the TABI thermal insulation described above two inches square, one inch thick and weighing 5.45 grams is immersed in 35 ml of the dilute silicone solution which penetrates throughout the insulation, thereby coating the fibers. The TABI is then removed from the solution and permitted to dry in the air at ambient conditions. After drying, the coated insulation is heated at 100° C. for 2 hours. The silicone coated insulation is weighed and found to contain 6.9 wt. % silicone compared to the original weight of the insulation.

The silicone coated insulation is then heated in air at 1,000° C. for 15 min. to convert the silicone to silica by pyrolysis, thereby resulting in the fibers of the TABI insulation being coated with silica. After pyrolysis, the insulation is again weighed and contains 4.9 wt. % silica. That the fibers are coated with silica is verified by infra-red and wet chemistry analysis. The pyrolyzed sample is then placed in a plastic bag which is sealed. Then 0.28 ml of dimethylethoxysilane (EMS), a silane waterproofing agent, is injected into the center of the insulation in the bag and the bag left sealed for 24 hours. After 24 hours, the DMES treated insulation is removed from the bag, weighed and immersed in distilled water for 15 min. The insulation is removed from the water and reweighed. Based on the weight of the insulation, the water pickup is 9.5 wt. %, thus proving the efficacy of the invention.

Comparative Example A

In marked contrast to the results in Example 1, a similar sample of the TABI insulation which is not coated with silica according to the practice of the invention and is also not coated with the DMES waterproofing agent is immersed in distilled water for 15 min., removed from the water and weighed. It is found to have absorbed 581 wt. % water. This example thus demonstrates the need for waterproofing the insulation.

Comparative Example B

A similar sample of the TABI insulation which is coated with silica according to the procedure in Example 1, but which is not coated with the DMES waterproofing agent, is immersed in distilled water for 15 min., removed from the water and weighed. It is found to have absorbed 578 wt. % water. This example demonstrates that coating the fibers of the insulation with silica does not render it waterproof.

Comparative Example C

This experiment demonstrates the difficulty of waterproofing ceramic insulation which contains ceramic material, such as alumina, which is difficult to waterproof with a silane waterproofing agent. In this experiment a sample of the TABI insulation similar to that used in Example 1, except that it weighed 49.5 grams. The insulation was placed in a plastic bag. The bag was then sealed and 2.5 ml (one unit) of the DMES silane waterproofing agent injected through the bag and into the center of the insulation and the bag left sealed for 24 hours. After the 24 hours the treated insulation is immersed into distilled water for 15 min., removed and weighed. The silane treated insulation is found to have picked up 581 wt. % water. Another sample of the untreated TABI insulation is placed in a plastic bag which is sealed and 14.5 ml the DMES injected into the middle of the insulation. The bag is again left sealed for 24 hours. After this the insulation is removed from the bag, immersed in distilled water for 15 minutes, removed and weighed. It is found to have absorbed 570 wt. % water. A third sample of the TABI is placed in a sealed plastic bag and 29 ml of the DMES injected into it through the bag. The bag remains sealed and after 24 hours the treated insulation is removed from the bag, immersed in distilled water for 15 min., removed from the water and weighed. It is found to have absorbed 125 wt. % water. A fourth sample of the TABI insulation is injected with 43.5 ml of the DMES waterproofing agent and the bag is then open after 24 hours, the treated insulation removed, immersed in distilled water for 15 min., removed from the water and weighed. It is found to have absorbed 90 wt. % water. A fifth sample of the TABI insulation is treated with 59 ml of the DMES the bag kept sealed for 24 hours, the treated insulation then removed, immersed in the distilled water for 15 min. and weighed. After a being treated with 59 mL of DMES, the treated TABI is found to have absorbed 44 wt. % water.

Thus, even after being treated with over 20 times the equivalent amount of DMES silane waterproofing agent used to waterproof the insulation in Example 1, the water absorption of the treated insulation is still unacceptably high and more than four times that of Example 1.

Example 2

The waterproofed sample of TABI prepared in Example 1 according to the practice of the invention is tested for stability and reusability by rewaterproofing. The silica and DMES coated sample of Example 1 is heated in air at 1,000° C. to burn off the DMES waterproofing agent by pyrolysis, thereby simulating the thermal conditions which occur when a space shuttle or other space vehicle enters earth's atmosphere. The pyrolyzed sample is placed in a plastic bag which is sealed and 0.28 ml of the DMES injected into the center to rewaterproof the insulation. The rewaterproofed insulation is immersed in distilled water for 15 minutes, removed and weighed. The water absorption or pickup is 3.9 wt. %. This procedure of pyrolyzing and rewaterproofing is repeated two more times with the same sample and the water absorption is found to be 7.8 wt. % and 7.0 wt. %, respectively. This thus demonstrates the permanence and reusability of the silica coated ceramic TABI insulation and its ability to be successfully rewaterproofed after the DMES has been burned off during entry of an insulated space vehicle into earth's atmosphere.

Example 3

The same procedure is used in this example that is used in Example 1, except that instead of the RTV655 being the silica precursor used to form the silica coating on the fibers of the TABI insulation, Dow Corning 200 silicone oil is used as the silica precursor. The TABI insulation is immersed in a 2 wt. % solution of the Dow Corning silicone oil in acetone, air dried to eliminate the acetone and then heated in air at 1,000° C. for 2 hours to convert the silicone oil to silica by pyrolysis. The silica coated ceramic insulation is weighed and found to have a silica content of 7.6 wt. %. After placing the pyrolyzed sample of insulation in a sealed plastic bag, injecting 0.28ml of the DMES waterproofing agent into the center of the sample, leaving the bag sealed for 24 hours, and then immersing the DMES treated insulation sample in distilled water for 15 min., the water absorption or pickup is found to be only 0.02 wt. %. Thus, this experiment further demonstrates the efficacy of the practice of the invention.

Example 4

In this demonstration of the practice of the invention, a 5.7 gram sample of the TABI insulation is placed in a CVD chamber operated at ambient temperature. The chamber is cylindrical, being 10 cm in diameter and 10 cm high. Trichlorosilane vapor is passed through the chamber at a rate of 50 cc/min. for 30 min. After this, 50 cc/min. of nitrogen saturated with water vapor, also at ambient temperature (23° C.), is passed through the chamber for 30 min. to form a thin coating of siloxane on the insulation. This cycle is repeated once more and the chamber sealed for 16 hours. The treated TABI sample is removed, weighed and found to have increased in weight by 1.1 wt. %. The treated sample is then heated in air at 1000° C. for 15 min. to pyrolyze the siloxane coating to a silica coating and the TABI sample is reweighed. After pyrolysis the sample contains 1.05 wt. % silica. The pyrolyzed sample is placed in a plastic bag which is sealed and injected with 0.28 ml of DMES, left in the sealed bag for 24 hours, immersed in distilled water for 15 min., removed from the water and weighed as in Example 1. Water pickup is 0.8 wt. %. The sample is then heated in air at 1000° C. air to burn off the DMES, rewaterproofed with the DMES, immersed in water and weighed to determine water absorption. This is done three times. The water absorption results are 4.8, 3.9 and 4.7 wt. %, respectively. This demonstrates that the silica coating is reusable after four cycles of being heated in air at 1,000° C. and rewaterproofed Example 5

The procedures in Example 4 are repeated in this example, but another silane waterproofing agent, hexamethyldisilazane (HMDS), is used instead of the DMES. Thus, a sample of TABI is placed in the CVD chamber at 23° C. and 50 cc/min. of trichlorosilane vapor is passed through the chamber for 30 min., followed by 50 cc/min. of nitrogen saturated with water vapor, etc. to form a siloxane coating on the ceramic fibers, with two deposition cycles being used as in Example 4. The chamber is sealed for 16 hours after which the siloxane coated ceramic insulation is removed and then heated in air for 15 min. at 1000° C. to pyrolyze the siloxane coating to a silica coating. The pyrolyzed insulation is weighed and the silica content is 1.4 wt. %. The pyrolyzed sample is then waterproofed with the HMDS, immersed in distilled water for 15 min., removed from the water and weighed. The water absorption is 1.7 wt. %. The sample is then repeatedly pyrolyzed at 1000° C. in air to burn off the HMDS, rewaterproofed with the HMDS, immersed in water and weighed to determine water pickup as is done in Example 4. This is done twice. The water absorption or pickup results are 1.2 and 3.9 wt. %, respectively.

Example 6

This example is similar to Example 4, except that tetrachlorosilane is CVD deposited on the TABI sample, followed by wet nitrogen to form a silica coating on the ceramic fibers. Thus, the tetrachlorosilane is used as the silica precursor instead of the trichlorosilane. The so-formed siloxane coated ceramic insulation is heated in air at 1,000° C. as before. After pyrolysis, the TABI has a silica content of 0.32 wt. %. Waterproofing with DMES followed by heating in air to burn off the DMES and rewaterproofing with the DMES results in water pickup or absorption of 15.6 and 16.2 wt. %, respectively.

Example 7

This example is similar to Example 6, except that after the silica coated ceramic is waterproofed with the DMES and the DMES waterproofed ceramic is heated in air to pyrolyze the DMES, the sample is rewaterproofed with HMDS instead of DMES. After rewaterproofing the water pickup is only 4.8 wt. %.

Example 8

In this example a space vehicle, such as a space shuttle, has fibrous ceramic insulation such as the flexible TABI described above which contains the alumina batting and which is waterproofed according to the practice of the invention in which the fibers of the insulation are coated with a silica coating and then coated with a silane waterproofing agent. The vehicle is exposed to the atmosphere for several days before lift-off during which a rain storm occurs a day before the scheduled lift-off. The insulation on the vehicle absorbs less than 5 wt. % water which is not detrimental to launching and operating the shuttle in space. The space shuttle goes into orbit for a period of time and returns to earth. On reentering the earth's atmosphere during its return to earth, the aeroconvective heat experienced on reentry burns the silane waterproofing agent off the ceramic insulation. After arrival and docking on earth's surface, the space shuttle is moved into a processing enclosure. A silane waterproofing agent, such as HMDS, is injected into the ceramic insulation at a plurality of injection points around the vehicle. The surface of the vehicle is then sealed with a plastic covering. After 24 hours the plastic covering is removed from the vehicle and the ceramic insulation is again waterproof. The space vehicle is again able to withstand contact with water or water vapor with less than 5 wt. % water absorption of the ceramic insulation. After preparations have been made, the rewaterproofed vehicle is again ready to be launched into space without damage to the ceramic insulation should it rain shortly before lift-off. Thus, the practice of the invention permits the ceramic insulation on the space vehicle to be rewaterproofed in-situ on the vehicle. This procedure is repeated many times before the ceramic insulation must be removed from the vehicle and the silica coating reapplied to the insulation.

Example 9

In this experiment a sample of the TABI insulation was contacted with methyltrimethoxysilane (MTMS) liquid/vapor at ambient conditions as a silica presursor. After one hour, the MTMS coated sample was then placed in a sealed plastic bag and treated with DMES waterproofing agent, the bag left sealed for 24 hours, the treated sample removed, immersed in distilled water for 15 min., removed and weighed. The sample is found to have absorbed less than 25 wt. % water. The sample is then heated in air at 1,000° C. for two hours which destroyed the waterproofing and pyrolyzed 50% of the MTMS silica precursor to silica. This sample is then rewaterproofed with the DMES and the water absorption is still less than 5 wt. %. This example thus demonstrates an embodiment in which a reusable silica coating is formed formed on the insulation during simulated space vehicle reentry conditions.

It is understood that various other embodiments and modifications in the practice of the invention will be apparent to, and can be readily made by, those skilled in the art without departing from the scope and spirit of the invention described above. Accordingly, it is not intended that the scope of the claims appended hereto be limited to the exact description set forth above, but rather that the claims be construed as encompassing all of the features of patentable novelty which reside in the present invention, including all the features and embodiments which would be treated as equivalents thereof by those skilled in the art to which the invention pertains.

What is claimed is:

1. A method for waterproofing porous ceramic thermal insulation having an exterior and an interior surface which comprises coating said exterior and interior surfaces with a silica precursor, converting said precursor to silica to form a silica coating less than one micron thick, and then coating said silica coated ceramic with a coating of a silicon containing waterproofing agent less than one micron thick.

2. A method according to claim 1 wherein said precursor is converted to silica by heating in an oxidizing atmosphere at a temperature and for a time sufficient to effect said conversion.

3. A method according to claim 1 wherein said silica precursor decomposes on said exterior and interior surface to form said silica coating during said deposition process.

4. A method according to claim 3 wherein said waterproofing agent is selected from the group consisting of a substituted silane, a silazane and mixture thereof.

5. A method according to claim 4 wherein said thermal insulation has a void volume of more than 90%.

6. A method according to claim 5 wherein said ceramic includes alumina.

7. A method according to claim 2 wherein said waterproofing agent is selected from the group consisting of a substituted silane, a silazane and mixture thereof.

8. A method according to claim 7 wherein said ceramic includes alumina.

9. A flexible waterproofed ceramic composite comprising a porous ceramic blanket insulation fabricated from ceramic fibers, wherein said composite has an exterior surface which is coated with a thin coating of silica less than one micron thick and wherein a thin coating of a silicon containing waterproofing agent less than one micron thick is disposed over said silica coating.

10. A method according to claim 1 wherein said waterproofed insulation is exposed to a high temperature environment which removes said waterproofing agent, but not said silica coating, and wherein a coating of said waterproofing agent is reapplied to said silica coated surfaces.

11. A method according to claim 1 wherein said waterproofed thermal insulation absorbs less than 25 wt. % water after being immersed in distilled water for fifteen minutes.

12. A method according to claim 5 wherein said waterproofed thermal insulation absorbs less than 15 wt. % water after being immersed in distilled water for fifteen minutes.

13. A method according to claim 5 wherein said waterproofed thermal insulation absorbs less than 5 wt. % water after being immersed in distilled water for fifteen minutes.

14. A method for waterproofing porous thermal insulation having an exterior and an interior surface which comprises at least one ceramic material and which is useful for the thermal protection system on a space vehicle, said method comprising coating said exterior and interior surface with a silica precursor, converting said precursor to silica to form a silica coating less than one micron thick, and then coating said silica coated exterior and interior surfaces with a coating less than one micron thick of a silicon containing waterproofing agent.

15. A method according to claim 14 wherein said waterproofed insulation absorbs less than 15 wt. % water after being immersed in distilled water for fifteen minutes.

16. A method according to claim 14 wherein said insulation includes alumina.

17. A method according to claim 16 wherein said alumina is in the form of a batting made of alumina fibers.

18. A method according to claim 14 wherein said silica precursor converts to silica during said coating process.

19. A method according to claim 18 wherein said waterproofed insulation absorbs less than 15 wt. %, water after being immersed in distilled water for fifteen minutes.

20. A method according to claim 19 wherein said insulation includes alumina.

21. A method according to claim 16 wherein said alumina is in the form of a batting made of alumina fibers.

22. A method according to claim 21 wherein said waterproofed insulation absorbs less than 15 wt. % water after being immersed in distilled water for fifteen minutes.

23. A method according to claim 19 wherein said waterproofed insulation absorbs less than 10 wt. % water after being immersed in distilled water for fifteen minutes.

24. A method according to claim 14 wherein said insulation has a void volume of at least 90%.

25. A method according to claim 14 wherein said waterproofed insulation is exposed to a high temperature environment which removes said waterproofing agent, but not said silica coating, and wherein a coating of said waterproofing agent is reapplied to said silica coated surfaces.

26. A method for waterproofing a porous and flexible thermal insulating material having an exterior and an interior surface and comprising at least one material from the group consisting of fabric, batting, fiber and felt made of at least one member from the group consisting of ceramic fiber, thread and filament, said method comprising coating said exterior and interior surfaces with a silica precursor, converting said precursor to silica to form a silica coating less than one micron thick, and then coating said silica coated surfaces with a coating less than one micron thick of a silicon containing waterproofing agent.

27. A method according to claim 26 wherein said insulation comprises a multilayered flexible blanket of insulation comprising at least one layer containing of at least one material of from the group ceramic fabric, batting, fiber and felt.

28. A method according to claim 27 wherein at least one of said layers comprises a ceramic fabric which comprises alumina fiber.

29. A method according to claim 27 wherein at least one of said layers comprises alumina.

30. A method according to claim 27 wherein said waterproofed insulation is exposed to a high temperature environment which removes said waterproofing agent, but not said silica coating, and wherein a coating of said waterproofing agent is reapplied to said silica coated surfaces.

31. A waterproofed, porous and flexible thermal insulating material having an exterior and an interior surface and comprising at least one material from the group consisting of fabric, batting, fiber and felt made of at least one member from the group consisting of ceramic fiber, thread and filament, wherein exterior and interior surfaces are coated with a silica coating less than one micron thick and wherein said silica coated surfaces are coated with a coating less than one micron thick of a silicon containing waterproofing agent.

32. A material according to claim 31 having a void volume of at least 90%.

33. A material according to claim comprising alumina and which absorbs less than 25 wt. % water after being immersed in water for fifteen minutes.

* * * * *